3,003,390
METHOD OF REPRODUCING BILINGUAL SOUND MOTION PICTURE FILM
Eugene A. Lukawiecki, 2718 E. 2nd St., Long Beach, Calif.
Filed Oct. 31, 1958, Ser. No. 770,982
2 Claims. (Cl. 88—16.2)

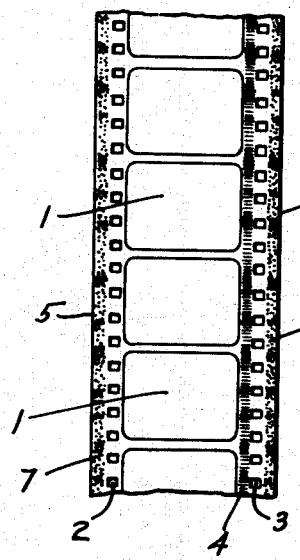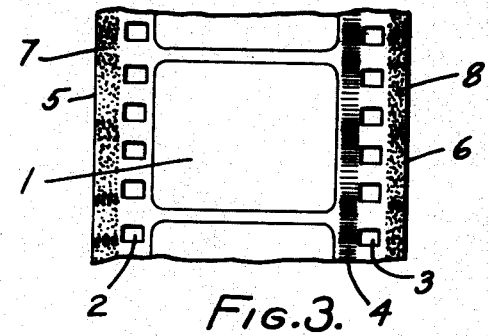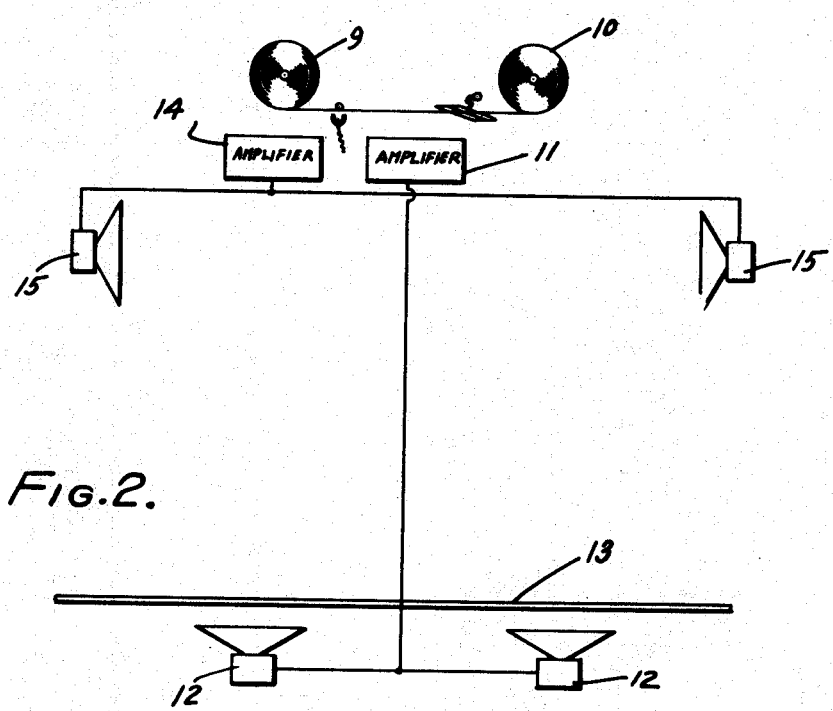

The present invention relates to sound motion picture film of a type which is termed bilingual in that the film is particularly adapted to permit the reproduction of two sound tracks each in a different language, the reproduction being simultaneous through independent sound channels and independent loud speaker systems.

I have determined from actual experience with my invention that if I provide for the motion picture film a photoelectrical sound track of either the variable density or variable width type and which combines sound effects with a dialogue, and also provide for said film a pair of marginal magnetic sound tracks without sound effects and which magnetic sound tracks have recorded thereon the same dialogue in a different language and then relate the two language dialogues in a manner to be described, that the listening audience during the film run is not disturbed by the difference in language. This renders foreign films acceptable in any country and the language barrier ceases to be a problem.

At present most motion picture films bearing sound in a language foreign to the audence requires film adjustment such as by dubbing and the use of printed sub titles. In the case of dubbing, the original dialogue of the foreign film is replaced by a newly recorded dialogue in the desired foreign language. As is obvious, such a dubbing process is difficult to perform due to foreign versions or synchronizations as it requires a different speaker for every role in the picture and is often rejected by the audience largely on account of lack of synchronization of the spoken word with lip movements of the actors. Very often the folkloristic atmosphere of the film is lost by replacing the original dialogue with an alien, unsuitable language, often incongruous and ridiculous.

So far as sub titles are concerned, the condensed translation of the dialogues are usually printed in the lower part of the picture on the film. This is not satisfactory because it distracts the viewer from seeing the action on the film while reading the sub titles. However, in many countries sub titles are of little help due to strange alphabets such as used in Japan, India, Arabia, Ethopia and many other countries where sub titles cannot be read because the people are illiterate.

An object of my invention is therefore to provide a sound film which may be shown in any country having a language foreign to the origin of the sound film and wherein the particular language of the country in which the foreign film is shown is spoken simultaneously with a foregin language in a manner not confusing to the viewer of the film, which film is inexpensive to produce and far superior to methods of production of film for use in countries foreign to its origin now known to the inventor.

A further object is to produce a bilingual sound motion picture film wherein dubbing and the use of sub titles is not required.

A further object is the provision of a bilingual sound motion picture film which does not require different actors for translating foreign dialogues into the language of the country where the film is being shown. With respect to this object, I have discovered that whereas the film may have different actors talking in their native language together with sound effects, the interpreter may be one person translating the language for both sexes and in such a manner as not to detract from the picture being shown.

In the drawing:
FIGURE 1 is a fragmentary view of a strip of motion picture film incorporating the invention,
FIGURE 2 is a diagrammatic vew of a system for reproducing the sound film of FIGURE 1, and
FIGURE 3 is a fragmentary enlarged view of the sound film shown in FIGURE 1.

I propose by the present invention to provide prints of a sound motion picture made in one country for release in a foreign country, wherein the sound motion picture is shown to the foreign public in the original untouched version thereof so as to preserve the intended, artistic and folkloristic value of the picture together with the vocal expression of the performing actors and simultaneously with such projection of the sound film to provide in the foreign country a translation in the language of said foreign country which is spoken simultaneously with the original dialogue on the said motion picture film.

Referring to FIGURES 1 and 3, I have shown a standard 35 mm. motion picture film and wherein the frames 1 are closer to the line of sprocket holes shown at 2 than the second line of sprocket holes shown at 3 to permit the normal sound track 4 to be placed between ends of the frames and said holes 3. This is standard practice in the industry. The sound track 4 may take several forms such as the variable width or variable density type and may even be of the magnetic type. Usually on standard motion picture film of the 35 mm. type, there is sufficient spacing between the guided edges 5 and 6 of the film and the sprocket holes 2 and 3 for the interposition of further sound tracks here designated as 7 and 8. With my invention I provide such sound tracks 7 and 8 and preferably these sound tracks are of the magnetic type. Primarily the film will be provided with the scanning areas or frames 1 and the recorded sound track 4, which sound track as previously stated, carries both the dialogue and sound effects and such dialogue and sound effects for the track 4 may be dubbed on the film after the picture has been taken or the sound effects and dialogue may be photographed simultaneously with the taking of the picture as is often done in the case of news prints where on-the-spot interviews are held.

The unrecorded magnetic sound tracks 7 and 8 are placed upon the motion picture film and a record is made thereon by a single native speaker of the foreign country in which the film is to be shown, the single native speaker interpreting for all the actors both male and female. To accomplish this, the translation by the native speaker is recorded on the magnetic film strips 7 and 8 simultaneously and at a time delay interval after the start of the original dialogue on the sound track 4, preferably in any pauses that may occur in the original dialogue on sound strip 4. The interpreter records through suitable recording heads on the magnetic sound tracks 7 and 8, and such recording is done in a manner sufficient to allow for a difference in volume between the sound track volume of sound track 4 and those on tracks 7 and 8. In other words, during an interval or pause between dialogues, of sound track 4, the volume of sound tracks 7 and 8 is increased and then reduced. This accentuates the translation of the dialogue in the language of the viewing audience.

It may be thought that confusion would result due to two different langauges being spoken simultaneously. However, by having a time interval between the translation and the original dialogue, confusion does not result and further, I have found that by arranging my loud speakers for both the original dialogue and the translation thereof in a certain manner, any confusion in sounds which might result is effectively overcome so far as the listener is concerned. Thus in FIGURE 2 I have shown the film upon reels 9 and 10 which travel in the usual manner, with separate pick-up heads for both the magnetic sound tracks 7 and 8 and for the sound track 4. The sound track 4 is amplified by amplifier 11 in the usual manner, with leads to one or more loud speakers 12, situated behind the viewing screen 13. The pick-up heads for the sound tracks 7 and 8 are amplified by amplifier 14, which amplifier connects with loud speakers 15 situated in the rear of the auditorium with the axes of said loud speakers 15 in a 90° relationship to the axes of the loud speakers 12. I have not detailed the amplifiers nor the character of the speakers nor the pick-up heads as such devices are well known in the art.

Preferably, after projection of the film commences and the dialogue and background on the sound track 4 are heard on the loud speakers 12 and after approximately 20 frames have been projected, assuming of course that dialogue has commenced, translation of the dialogue is heard on the loud speakers 15. Preferably there is a suppression of the volume of the sound emitted by loud speakers 12 of approximately twenty percent less volume than that emitted by the loud speakers 15. This suppression of sound is not readily accomplished in the projection booth and accordingly this suppression of volume is preferably made at the time that the magnetic recordings are made by the translator. It is possible within the art to provide magnetic control of volume. However, I have found it expedient in actual practice to make said control during the recording of the magnetic film tracks.

I provide the two magnetic film tracks 7 and 8 with like recordings so that any damage to one or the other thereof will not effect reproduction. It is a known fact that magnetic sound tracks are often subjected to damage due to bending of the film and general inflexibility of the magnetic particles making up the sound track. Furthermore, it often becomes necessary to cut, splice and edit a film and when this happens, the magnetic sound track is often damaged and therefore the use of two magnetic sound tracks both recorded in the same manner is of advantage. Furthermore, magnetic sound tracks have a certain thickness and the use of two magnetic tracks situated between each guide edge and the sprocket holes assures a uniform thickness of the film at these areas. In any event, the use of two magnetic sound tracks assures synchronization particularly when it is realized that motion picture film is subjected to shrinkage and expansion.

While I have described and shown my invention as particularly adapted to motion picture theaters, yet it may be used with equal ease for television. If a foreign film is to be shown on television, it is evident that the use of dubbing and sub titles are unsatisfactory for the very reason that sub titles are invisible on the television screen. However, by using the present system, the reproduction will remain the same as in motion picture theaters. I may provide the translating language on a separate recorded magnetic tape and which translation could be channeled simultaneously and synchronously on another wave for a radio receiver. The outlets or loud speakers would then be the same as in the theater; i.e., the TV screen in front of the viewer and the radio receiver to the right or left and at an angle of 90° to the television speaker.

The system such as I have disclosed is adaptable for travelogues and documentary films which allow the natives to be photographed and heard in their native language simultaneously with a translation thereof rather than in broken idioms of the language in which the film is made.

Actual experience with my invention has shown that I can produce film at a cost of twenty percent of the cost of dubbing film as generally employed where American film is shown in foreign countries, and likewise at a cost of twenty percent of the cost of providing sub titles.

It is important to the present invention that separate speakers be used as shown in FIGURE 2 for the film track 4 and for the film tracks 7 and 8. A single amplifier and speaker for the said sound tracks is not satisfactory and only causes confusion of sound. This is true whether the film is projected for television viewers or in the theater as has been previously described.

I claim:

1. The method of bilingual film reproduction with sound allocation which consists in providing a positive motion picture film having picture frames and recorded sound track carrying both original dialogue in one language and sound effects related to the picture frames, the picture frames adapted to be projected upon a viewing screen situated forwardly of the audience and the sound source of said original dialogue in one language being situated to the rear of said viewing screen; providing an unrecorded magnetic sound track and recording on said unrecorded magnetic track a translation of the original dialogue in a language foreign to the language of the original dialogue by a single translator for all actors both male and female in the original dialogue, and the sound source for said language by the single translator being located at the rear of the audience, and commencing the translation by the translator after a time delay interval from the start of the original dialogue on the original recorded sound track of approximately twenty picture frames.

2. The method of claim 1: increasing the signal level of the translator's voice on the magnetic sound track during intervals in the original recorded sound dialogue.

References Cited in the file of this patent

UNITED STATES PATENTS

| 1,473,976 | Ries | Nov. 13, 1923 |
| 2,628,288 | Blaney | Feb. 10, 1953 |
| 2,826,112 | Mueller | Mar. 11, 1958 |